US009499452B2

(12) United States Patent
Courtright

(10) Patent No.: US 9,499,452 B2
(45) Date of Patent: Nov. 22, 2016

(54) WATER ELECTROLYSIS GASES USED AS PRIMARY FUEL TO COMBUST MATERIALS AS SECONDARY FUELS

(71) Applicant: Geoffrey Courtright, Bonita Springs, FL (US)

(72) Inventor: Geoffrey Courtright, Bonita Springs, FL (US)

( * ) Notice: Subject to any disclaimer, the term of this patent is extended or adjusted under 35 U.S.C. 154(b) by 1 day.

(21) Appl. No.: 14/504,251

(22) Filed: Oct. 1, 2014

(65) Prior Publication Data

US 2015/0096223 A1   Apr. 9, 2015

Related U.S. Application Data

(60) Provisional application No. 61/888,411, filed on Oct. 8, 2013.

(51) Int. Cl.

| C10L 5/00 | (2006.01) |
|---|---|
| C06B 33/00 | (2006.01) |
| C25B 1/04 | (2006.01) |
| G21F 9/30 | (2006.01) |
| C10L 5/36 | (2006.01) |
| C10L 5/44 | (2006.01) |
| C10L 3/00 | (2006.01) |
| C25B 15/08 | (2006.01) |
| G21F 9/32 | (2006.01) |

(52) U.S. Cl.
CPC ............... *C06B 33/00* (2013.01); *C10L 3/003* (2013.01); *C10L 5/36* (2013.01); *C10L 5/44* (2013.01); *C25B 1/04* (2013.01); *C25B 15/08* (2013.01); *G21F 9/30* (2013.01); *G21F 9/32* (2013.01); *C10L 2200/0277* (2013.01); *C10L 2200/0295* (2013.01); *C10L 2290/08* (2013.01); *C10L 2290/24* (2013.01); *Y02E 50/10* (2013.01); *Y02E 50/30* (2013.01); *Y02E 60/366* (2013.01); *Y02E 70/10* (2013.01)

(58) Field of Classification Search
CPC ............ C10L 5/36; C10L 5/44; C10L 3/003; C10L 2200/0277; C10L 2200/0295; C10L 2290/08; C10L 2290/24; C06B 33/00; C25B 1/04; C25B 15/08; G21F 9/30; G21F 9/32; Y02E 50/10; Y02E 70/10; Y02E 60/366; Y02E 50/30
See application file for complete search history.

(56) References Cited

U.S. PATENT DOCUMENTS

| 7,533,530 B2 | 5/2009 | Courtright |
| 2004/0149591 A1* | 8/2004 | Klein ........................ B01J 4/00 205/628 |

* cited by examiner

*Primary Examiner* — Cephia D Toomer
(74) *Attorney, Agent, or Firm* — Porter Wright Morris & Arthur

(57) ABSTRACT

A primary fuel catalyst used to combust a secondary fuel, the primary fuel comprising the gases produced by water electrolysis. When secondary fuels are combusted by the primary fuel, the by-products include heat, water and other more stable by-product materials. When the secondary fuel is a hazardous waste or a radioactive material and either is bound to thermite before combustion, the by-products are no longer hazardous or have significantly reduced radiation levels after one or more passes. Embodiments of the present invention relate to the method for accelerating the decay of hazardous and/or radioactive waste products, and more particularly they relate to the nuclear transmutation of heavy radioactive elements into lighter ones with shorter half-lives and then finally to stable daughter products. Therefore, the invented process relates to reducing the long-term toxicity of hazardous and/or radioactive waste and to, an economic and effective process facility for doing so.

12 Claims, 2 Drawing Sheets

WATER ELECTROLYSIS GASES USED AS PRIMARY FUEL TO COMBUST MATERIALS AS SECONDARY FUELS

This application claims the benefit of U.S. provisional patent application Ser. No. 61/888,411 filed Oct. 8, 2013, which is hereby incorporated by reference in its entirety.

BACKGROUND

Technical Field

The invention relates to energy conversion and combustion products generated from burning a primary catalyst fuel consisting of the gases produced from the electrolysis of water with secondary fuels consisting of various substances that are transformed in the process.

SUMMARY OF THE DISCLOSURE

I have created a version of a water electrolyzer that produces gases that have two unique applications as a primary fuel to be used to burn a secondary fuel for use with or without my engine. The gases produced by my electrolyzer, or a similar device, have in addition to the usual monatomic and diatomic hydrogen and oxygen, an apparent gaseous form of water that carries an extra charge. Therefore, the burning of the gases as a primary fuel not only has normal and very powerful oxidation and reduction capabilities, the burning gases also carry an electrical charge to the secondary fuel. This helps give the burning gases the capability to break down anything except water—it even burns tungsten which requires around 10,000 degrees F.

I have found two unique uses: The first use is as a primary fuel catalyst in a low pressure instance of my engine (U.S. Pat. No. 7,533,530). The appropriate electrolyzer creates gases that can be used in my engine as a primary fuel to break down a secondary fuel, in one case silicon dioxide is used, resulting in a tremendous amount of heat, pure silicon, water and oxygen. The heat is used in my engine to very efficiently make steam and the only other by-products are water, oxygen and pure silicon. There is no carbon foot print. The steam would then drive either my steam motor or any steam motor to do work, i.e. drive an electric generator head, etc.

The steam energy released is more than ten times the energy to electrolyze the water used. The electrolyzed water is just a catalyst as it can be reused. And on the motor side, the steam is condensed and recycled back to a steam engine. The only consumable is the fuel on the fuel rod—which is just pure sand and a little cement to bind it to the silicon carbide on the fuel rod—the silicon carbide is not consumed—it is a high temperature heat transfer platform to protect the stainless steel steam chamber. Sand and sufficient cement can be acquired for less than $0.20 per gallon which can deliver more energy than a gallon of gasoline.

This is a product that is low cost to manufacture and can be used in conjunction with a small low cost fuel rod recycling device. Target customers would require either electric or kinetic power with absolutely no pollution or have easy access to sand and cement but not to fossil fuels.

Fuels include silicon dioxide (and all of its forms—sand, mica, quartz, etc.) and other ceramics. Silicon dioxide is a preferable ceramic as a secondary fuel in that it produces oxygen and no toxic by-products. The primary fuel will burn any ceramic (or anything) including the various forms of feldspar (granite). It will combust, include melt, boil or sublimate anything except water. It also breaks down biohazardous waste (sewer sludge, bio-waste, etc.).

All of the claims herein can be accomplished using my engine with an appropriate transport mechanism. The primary fuel can also be used with various secondary fuels to generate the heat and the neutralized by-products without using the engine to capture the heat.

The second use for the electrolyzer gases is that, when the gases are burned on a secondary fuel of either a bio-hazardous or radioactive material bound to thermite, the material is quickly reduced after one or more passes to a stable set of compounds that are no longer bio-hazardous or have significantly reduced radiation levels creating a mechanism for both the disposal of bio-hazardous or nuclear/radioactive waste while at the same time extracting usable energy.

A key enhancement to the process is the addition of two low cost chemicals to the fuel rod used for radioactive and/or bio-hazardous waste. They are not acting as catalysts because they too are also transformed, but in that process they produce hot plasma and additional ions that greatly speed up the process. Radiation reduction is currently thought to only happen in a transmutation reactor, which is very expensive; however, this process is simple and not expensive.

The process overview follows: Dry and pulverize the hazardous material and blend it with a mixture of low cost materials, specifically the powders of Aluminum and Iron Oxide in a thermite blend, and then bind them together using a small amount of water and low cost liquid binder. Blend about 50% radioactive material or bio-hazardous material with about 50% of thermite; however, less thermite may be used. The water and binder (Elmer's® or similar) are mixed about 50/50, and then about 1 part water/glue is mixed with about 4 parts of the total powdered mixture of radioactive or bio-hazardous material and thermite. These mixtures can be varied, but these proportions seem to offer optimum performance.

After spreading the mixture and letting it dry, burn the hardened substance utilizing the cocktail of gases produced from the RedOxy electrolysis gas generator—or other similar electrolysis gas generator. The initial pass reduces the radiation count levels of any radioactive substance by about 75% and after pulverizing the byproducts again, the second pass lowers the original count levels by about 95%. The temperature during reaction is between 4,500 F.° and 10,000 F.°—the same temperature as a thermite reaction varying by conditions. Since there is an overabundance of monatomic hydrogen and oxygen ions, both reduction and oxidation reactions progress to completion simultaneously.

The reaction takes place quickly wherever the torch touches the fuel rod. It only reacts where the torch touches the fuel rod. The fuel rod does not continue to burn without the torch because the stoichiometrically balanced thermite mixture minus a fuse, i.e. magnesium, (just Aluminum and Iron Oxide) cools instantly as it is transformed. Depending on the size of the torch and volume of gas flow, a 12" by 1"

by ¼" fuel rod can be transformed in a few seconds creating the plasma and releasing a tremendous amount of energy in heat—a minimum of 3.9 kJ/g.

RedOxy™ Based on U.S. Pat. No. 7,533,530

Abstract

1. Essence—Highly efficient steam engine for transportation or power generation.
   a. Highly Efficient: RedOxy engine achieves nearly complete energy transfer from fuel(s) to steam using a highly insulated closed engine chamber that captures energy from oxidation/reduction and transfers heat through the chamber wall to water, producing steam.
   b. Low Emissions: Oxidation/reduction and rapid thermal transfer result in low emissions.
   c. Multi-Fuel: RedOxy can utilize combinations of gas, liquid or solid fuels.
   d. Higher Power to Weight Ratio: RedOxy can utilize lightweight materials with less complexity to achieve 500% higher power to weight ratio than current combustion engines.
2. R&D Development
   a. Develop and test two operational system prototypes.
   b. Test 3 fuel types.
3. Impact
   a. High efficiency, low emissions.
   b. Micro-power generation; reduced electricity cost.
   c. Alternative engine for transportation.

Technical Section

Figure 1:
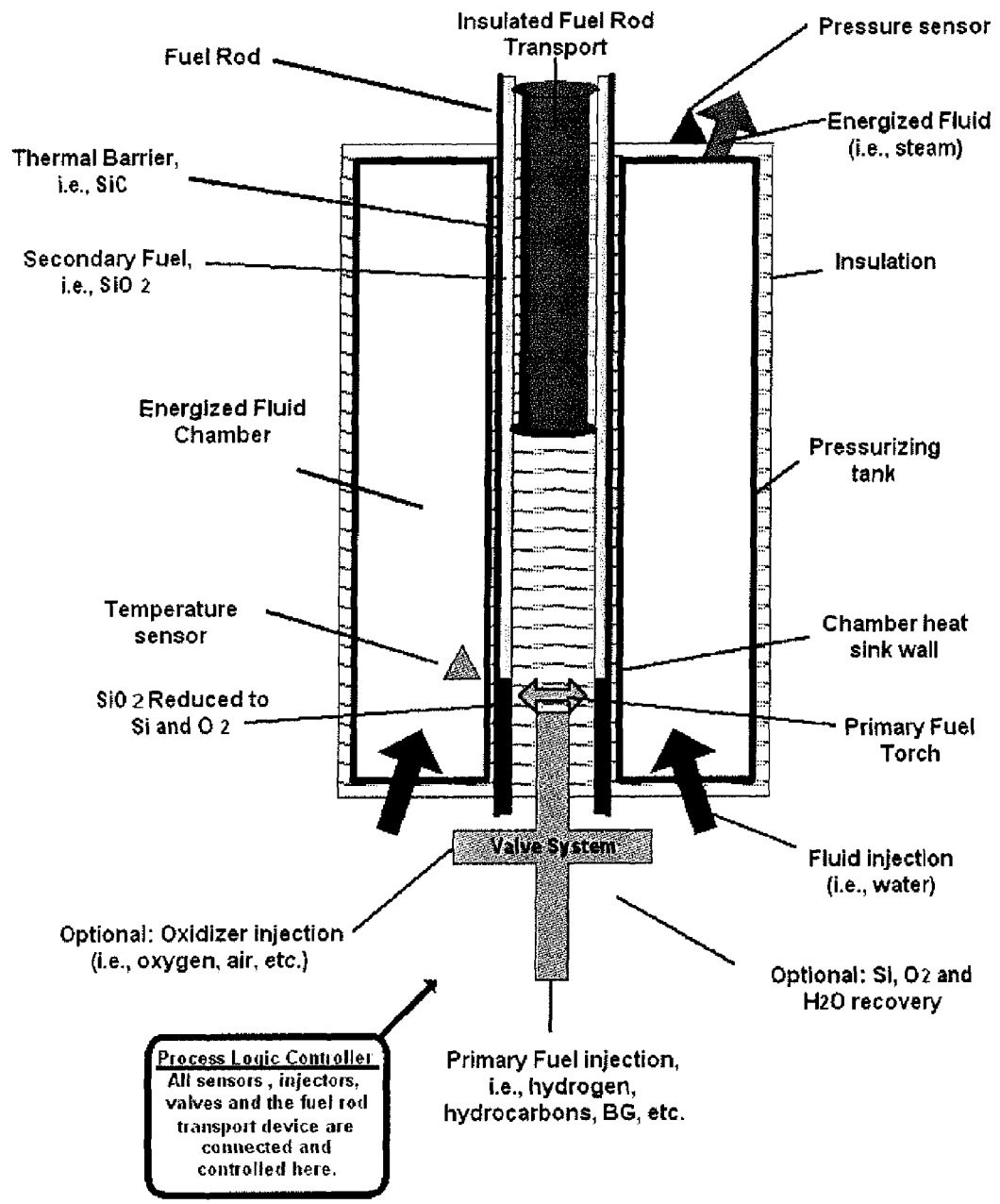
FIG. 1 is a cross-section of the RedOxy engine oxidation/reduction chamber surrounded by the insulated pressure tank and control valve system.
Figures 2, 3, 4, 5:
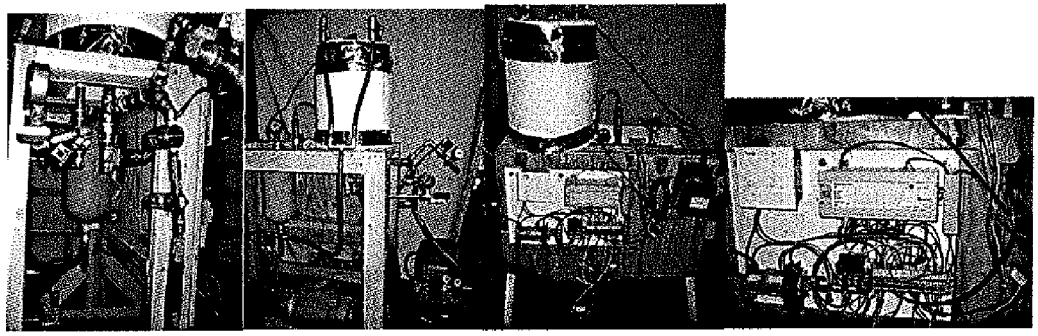
FIG. 2 depicts a pressure tank and control valve system.
FIG. 3 depicts the top oxidation/reduction/steam chamber with insulated covering.
FIG. 4 shows the tank and control system.
FIG. 5 illustrates an injector pressure tank and control valves showing the control system with PLC of the RedOxy engine.

1. Transformative technology description
   a. The RedOxy engine uses multiple fuel oxidation/reduction to create an energized fluid.
   b. The RedOxy engine comprises a controlled oxidation/reduction cycle of an oxidizer/reducer and single or multiple fuel mixtures in an oxidation/reduction heat sink chamber surrounded by a fluid-based energy transfer chamber. The RedOxy engine cycle involves: injection of optimum fuel and/or air mixture into an oxidation/reduction chamber; oxidation/reduction of fuel(s) and heat transfer to oxidation/reduction chamber wall; water injected over the chamber wall to accelerate heat transfer, converting to steam; exhaust of the steam pressure (work); then flush & recharge oxidation/reduction chamber.
   c. The engine can be thermally insulated to reduce heat losses.
   d. The RedOxy engine is a breakthrough in efficiency with the ability to extract over 95% of potential energy from fuel(s); over twice as efficient as conventional combustion engines.
   e. Having separate engine and motor components enables each component to be built with optimal construction materials for cost and specific functional requirements. This optimization of construction materials allows the RedOxy engine to be lighter weight and made with simpler construction which enables a lower cost of manufacturing, maintenance and repair. A very high power to weight ratio makes it useful for both transportation propulsion systems and distributed electrical power generation.
   f. The fuel can consist of any of the following or even combinations of the following:
      i. flammable liquid, i.e. hydrocarbons, e.g. gasoline, diesel, biodiesel, ethanol, etc.
      ii. flammable gas, e.g. hydrogen, hydrocarbon gases, methane, coal gas, etc.
      iii. flammable solids, e.g. ceramics, coal dust, hydrocarbon/biomass dust, etc.
      iv. pulverized radioactive and/or bio-hazardous waste blended with aluminum and iron oxide in a thermite blend,
   g. This instance of the engine utilizes two fuels. The primary fuel is derived from the electrolysis of water and is a catalyst fuel because the water used is also a by-product of the oxidation/reduction burning process and can then be reused. If the secondary fuel is the ceramic silicon dioxide (sand), the burning process releases heat for the engine to make steam, water, silicon and oxygen. There are no toxins and there is no carbon foot print.
   h. The controlled oxidation/reduction causes the complete oxidation of the fuel into its simplest components, thereby releasing the maximum energy—more than ten times the energy required for the electrolysis of water to create the primary fuel.
   i. The RedOxy oxidation/reduction cycle is environmentally favorable. Since the oxidation/reduction chamber rapidly transfers heat through the chamber wall, the consumed fuel particles quickly change from high energy states to lower energy states. Because this heat transfer happens rapidly, the radical elements do not inter-mix but rather recombine to their more elemental states. Most important is that any Nitrogen radicals that may form recombine back into Nitrogen due to the rapid cooling rather than forming $NO_x$ toxins.
   j. Because the oxidation/reduction cycle can be totally controlled, it can take place with an abundance of $O_2$, thereby preventing the formation of toxic carbon monoxide, CO.
   k. The excess $O_2$ also eliminates the production of Particulate Matter (PMs) and Volatile Organic Compound (VOCs)—toxic fractional hydrocarbons.
   l. The rapid cooling causes the condensation of the water vapor and it is easily trapped as liquid water at the exhaust, thereby eliminating a major contributor to GHGs (Green House Gas) by conventional combustion engines.
   m. RedOxy Programmable Logic Controller (PLC) software constantly samples and recalculates the optimum fuel to air mixture; therefore, by using temperature and pressure sensors and valve controls, it will be capable of determining the ideal combinations of even unknown fuels and oxidizers.
   n. Alpha prototype pictures of a RedOxy engine prototype developed and tested in 2007 are shown in FIGS. 2-5. FIG. 5 illustrates an injector pressure tank and control valves. FIG. 3 depicts the top oxidation/reduction/steam chamber with insulated covering. FIG. 4 shows the tank and control system. FIG. 5 shows the control system with PLC.
   o. A diagram of the RedOxy engine is shown in FIG. 1 on Page 11 is a low-pressure continuous detonation instance of Geoffrey Courtright's U.S. Pat. No. 7,553,530. FIG. 1 illustrates a cross-section of the RedOxy engine oxidation/reduction chamber surrounded by the insulated pressure tank and control valve system.
2. Current state of the art and RedOxy engine's unique and innovative approach
   a. Traditional internal combustion engines have been combined with a motor drive system. Separation of the engine and motor drive systems enables efficiencies in heat transfer, cycle timing, construction materials and flexibility of use.
   b. By eliminating cycle timing constraints, the engine can be optimized to cycle based on the specific characteristics of the fuel type to achieve the optimum air/fuel mixture for the maximum extraction of the energy for each type of fuel.
  c. The RedOxy engine can consume combustible gas, liquid or solid fuels by a simple change of injector or fuel cell. With multiple injectors and/or fuel cells, fuels can be intermixed.
  d. A fuel with a lower temperature and/or pressure point of oxidation/reduction, such as natural gas or hydrogen, can be used to initiate the oxidation/reduction of a denser fuel that has a higher point of oxidation/reduction, such as biodiesel or a ceramic. This ability to mix fuels with different densities can help overcome conventional limitations of some fuels such as biodiesel being more difficult to ignite in colder temperatures.
  e. Traditional internal combustion engines do not burn the fuel completely, which results in unspent fuel and complex chemical combinations allowing toxins to be exhausted. With oxidation/reduction in the RedOxy, complete oxidation and reduction of the fuel(s) eliminates virtually all toxins including fractional hydrocarbons, e.g. PMs, VOCs, etc.
  f. After oxidation/reduction, the rapid transfer of energy to the heat sink wall of the oxidation/reduction chamber results in rapid cooling of the products of oxidation/reduction and prevents the formation of toxic nitrogen oxides ($NO_x$).

Impact Section
1. Why RedOxy is transformational
  a. The RedOxy engine is a breakthrough due to being more efficient in extracting potential energy from a fuel; it is much more efficient than current internal combustion engines.
  b. The RedOxy motor is a breakthrough as a more efficient mechanism to transfer potential energy to kinetic energy; it is also much more efficient than conventional combustion driven motors. The RedOxy motor will be built and tested in a separate project.
  c. The RedOxy engine is a true multi-fuel engine.
  d. The RedOxy produces near zero toxic emissions, fewer GHGs and no water vapor, which is the leading component of GHG.
  e. The RedOxy operates with no noise or heat pollution.
  f. The RedOxy is low cost to manufacture, highly scalable, light weight, non-hazardous and rugged.
  g. RedOxy technology enables directed micro-power generation reducing the need for expensive transmission lines and will revolutionize the power generation industry.
  h. The cost for electricity can be reduced wherever this technology is employed.
  i. The RedOxy is ideal for propulsion/transportation systems requiring multi-fuel and/or light weight highly efficient designs.
2. Potential impact on the economy and U.S. security
  a. RedOxy will enhance the economic and energy security of the United States through the development of a highly efficient low emission energy technology that will result in
    i. reductions of imports of energy from foreign sources;
    ii. reductions of energy-related emissions, including greenhouse gases; and,
    iii. improvement in the energy efficiency of all economic sectors.
  b. RedOxy technology and manufacturing is U.S.-based and helps ensure that the United States maintains a technological lead in developing and deploying an advanced energy technology.
  c. RedOxy significantly reduces GHG emissions: Water vapor, not factoring in clouds, still constitutes up to 66% of GHG. Traditional combustion engines and coal burning plants release all of the water vapor that they produce. The water by-product of the RedOxy oxidation/reduction process is released at a low temperature and is easily recaptured as liquid water. This excess collected water can be used directly for irrigation or through filtration as potable drinking water. The RedOxy technology can assist in the objectives to drive GHG emissions to 80% below 1990 levels by 2050, and ensure 25% of U.S. electricity comes from power generating sources with significantly reduced GHG by 2025.
  d. Similarly, RedOxy assists in enhancing Energy Security by reducing fuel use and the import of foreign produced fuels. By adopting RedOxy in both transportation and power generation, the U.S. can save more oil than the U.S. currently imports from the Middle East and Venezuela combined (more than 3.5 million barrels per day) within 10 years.
  e. RedOxy is the basis of further innovation in clean burning alternative fuel engines that are highly efficient. Development of the RedOxy technology will help restore the U.S. science leadership and strengthen America's role as the world leader in science and technology.
  f. The RedOxy engine can be rapidly developed as a use for alternative fuel technologies. Allowing multiple U.S. manufacturers to produce RedOxy units will create thousands of new green jobs and lay the foundation for those manufacturers to become world leaders in producing highly efficient power systems.
3. Quantitative impact
  a. The quantitative impact is determined by preliminary testing that has been performed on several prototype oxidation/reduction engines indicating the above mentioned low levels of the various emissions in the oxidation/reduction by-products.
  b. The major assumption is that to reach those levels of foreign fuel and emissions reductions, the RedOxy engine will need to be put into production and made available.
  c. An emissions test instrument used was a Hamilton Standard, Auto Sense, Model CUISNY 9000 Exhaust Gas Analyzer. This analyzer can detect 10 ppm of carbon Monoxide (CO) and none was detected. The analyzer detected 80 ppm of (HC).

Uses for the Gases from Water Electrolysis
1. Use with the RedOxy Engine as a primary fuel while burning a secondary fuel
  a. A RedOxy water electrolyzer, or similar, is utilized to create by-product gases. This common low-cost electrolyzer can be constructed using CPVC, stainless steel electrode plates, capacitors, a full wave bridge rectifier, and a water-based sodium hydroxide electrolyte. Power consumption is efficient and can be varied as more or less by-product gases are required. Off-the-shelf similar versions of electrolyzers are available.
  b. The water electrolyzer creates a cocktail of gases that include monatomic and diatomic hydrogen and oxygen, water vapor and an energized version of the water molecule that carries an additional electron.

c. The electrolyzer by-product gases produce a perfectly balanced stoichiometric combustion that does not require any additional oxygen to continue to burn.
d. The electrolyzer by-product gases when burning not only have the normal very powerful oxidation and reduction capabilities they also carry an electrical charge to the burned substance—the secondary fuel. This gives these burning gases the capability to break down anything except water into its most stable components—even tungsten burns which requires around 10,000 degrees F.
e. The electrolyzer creates gases that can be used in my engine, U.S. Pat. No. 7,553,530, as a primary fuel to break down a secondary fuel, in this instance silicon dioxide, resulting in a tremendous amount of heat as steam, pure silicon, water and oxygen. Other secondary fuels will still produce heat but by-products can vary.
f. This instance of the engine utilizes two fuels. The primary fuel is derived from the electrolysis of water and is a catalyst fuel because the water used is also a by-product of the oxidation/reduction burning process and can then be reused. If the secondary fuel is the ceramic silicon dioxide (sand), the burning process releases heat for the engine to make steam, water, silicon and oxygen. There are no toxins and there is no carbon foot print.
g. The controlled oxidation/reduction causes the complete oxidation of the fuel into its simplest components, thereby releasing the maximum energy—more than ten times the energy required for the electrolysis of water to create the primary fuel.
h. The engine oxidation/reduction cycle is environmentally favorable. Since the oxidation/reduction chamber rapidly transfers heat through the chamber wall, the consumed fuel particles quickly change from high energy states to lower energy states. Because this heat transfer happens rapidly, the radical elements do not inter-mix but rather recombine to their more elemental states. Most important is that any Nitrogen radicals that may form, recombine back into Nitrogen due to the rapid cooling rather than forming NOx toxins.
i. Because the oxidation/reduction cycle can be totally controlled, it can take place with an abundance of $O_2$, thereby preventing the formation of toxic carbon monoxide, CO.
j. The excess $O_2$ also eliminates the production of Particulate Matter (PMs) and Volatile Organic Compound (VOCs)—toxic fractional hydrocarbons.
k. The rapid cooling causes the condensation of the water vapor and it is easily trapped as liquid water at the exhaust, thereby eliminating a major contributor to GHGs (Green House Gases) by conventional combustion engines.
l. RedOxy Programmable Logic Controller (PLC) software constantly samples and recalculates the optimum fuel mixtures; therefore, by using temperature and pressure sensors and valve controls, it will be capable of determining the ideal combinations of even unknown fuels and oxidizers.
m. Alpha prototype pictures of a RedOxy engine prototype developed and tested in 2007 are shown on Page 5.
n. A diagram of the RedOxy engine is shown below in FIG. 1 is a low-pressure continuous detonation instance of Geoffrey Courtright's U.S. Pat. No. 7,553,530. FIG. 1 illustrates a cross-section of the RedOxy engine oxidation/reduction chamber surrounded by the insulated pressure tank and control valve system.

2. Use as a primary fuel to neutralize radioactive or bio-hazardous secondary fuels
a. The electrolyzer by-product gases when burning not only have the normal very powerful oxidation and reduction capabilities they also carry an electrical charge to the burned substance—the secondary fuel. This gives these burning gases the capability to break down anything except water into its most stable components—this includes radioactive materials or bio-hazardous toxic waste.
b. As the electrolyzer by-product gases burn the secondary fuel, heat is released which can be utilized and the secondary fuel material is reduced to more stable components.
c. Radioactive and bio-hazardous materials are reduced to much less radioactive and non-toxic component states.
d. The resulting materials can be harvested for resale to the appropriate industry.
e. This use can result in the cost-effective local neutralization/remediation of nuclear waste material, radioactive waste, and any type of bio-hazardous waste.
f. Since heat is released, the process can generate some or all its own power depending on the heat generated.
g. Utilizing this process, waste processing plants could potentially neutralize their toxic sludge, turn it into safe compost, and produce electricity.

I claim:

1. A method of combusting a secondary fuel using a primary fuel, the primary fuel comprising the gases produced by water electrolysis, comprising the steps of:
   (a) electrolyzing water to generate a primary fuel comprising the gaseous products of electrolysis; and
   (b) combusting a secondary fuel with said primary fuel wherein the secondary fuel is chosen from the group consisting of a ceramic, a feldspar, a granite, a bio-hazardous waste material bound to thermite, and a radioactive material bound to thermite.

2. The method of claim 1 wherein said primary fuel comprises monatomic and diatomic hydrogen and oxygen, and a gaseous form of water that carries an extra charge.

3. A method of combusting a secondary fuel using a primary fuel, the primary fuel comprising the gases produced by water electrolysis, comprising the steps of:
   (a) electrolyzing water to generate a primary fuel comprising the gaseous products of electrolysis; and
   (b) combusting a secondary fuel with said primary fuel, wherein the secondary fuel is in the form of a fuel rod.

4. A method of combusting a secondary fuel using a primary fuel, the primary fuel comprising the gases produced by water electrolysis, comprising the steps of:
   (a) electrolyzing water to generate a primary fuel comprising the gaseous products of electrolysis; and
   (b) combusting a secondary fuel with said primary fuel, wherein the secondary fuel comprises silicon dioxide.

5. The method of claim 1 wherein the secondary fuel is a ceramic, a feldspar or a granite.

6. The method of claim 1 wherein the secondary fuel is a bio-hazardous waste material bound to thermite.

7. The method of claim 1 wherein the secondary fuel is a radioactive material bound to thermite.

8. The method of claim 7 wherein heavy radioactive elements of the secondary fuel are first transmuted into lighter elements having shorter half-lives and then to stable daughter products, thereby reducing the long-term toxicity of secondary fuel.

9. The method of claim 3, wherein said fuel rod comprises a radioactive or bio-hazardous material.

10. The method of claim 3, wherein said fuel rod comprises:
- a radioactive or bio-hazardous material;
- thermite; and
- a binder.

11. The method of claim 3, wherein combusting of the secondary fuel with the primary fuel is performed in an oxidation/reduction chamber surrounded by a water-containing pressure tank such that heat generated by said combusting step produces steam in the pressure tank.

12. The method of claim 11, wherein the secondary fuel is combusted using a primary fuel torch.

* * * * *